INVENTOR
T. J. CHINLUND
BY Lucian C. Canepa
ATTORNEY

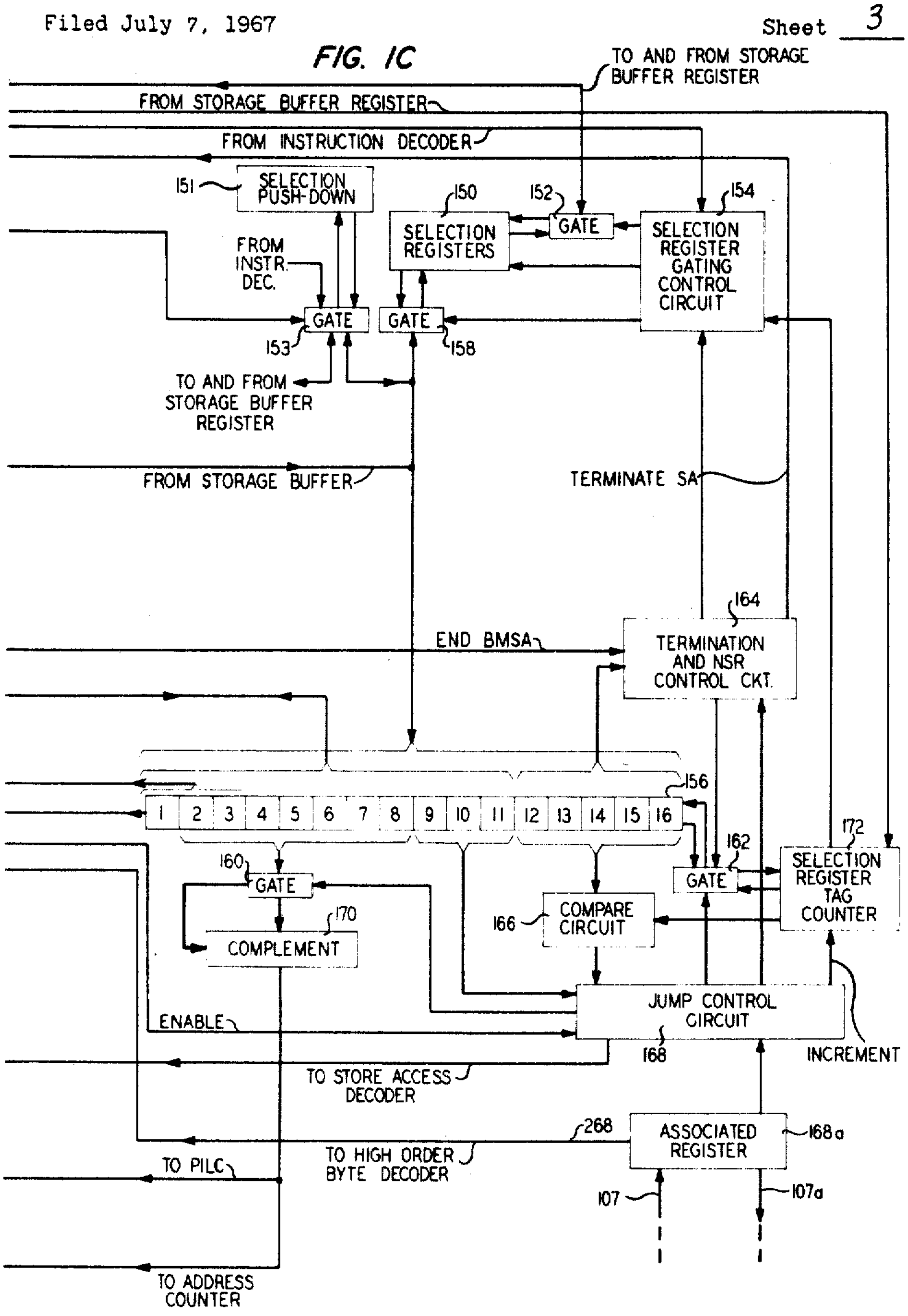
FIG. 2
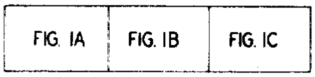

United States Patent Office 3,440,618
Patented Apr. 22, 1969

3,440,618

INFORMATION PROCESSING SYSTEM

Thomas J. Chinlund, Glen Ellyn, Ill., assignor to Bell Telephone Laboratories, Incorporated, Murray Hill, N.J., a corporation of New York

Filed July 7, 1967, Ser. No. 651,723
Int. Cl. G11b *13/00*
U.S. Cl. 340—172.5 26 Claims

ABSTRACT OF THE DISCLOSURE

By modifying a basic selective access system, a system characterized by unique data reordering capabilities is realized. In particular, the modified system is adapted to selectively access sequential or permuted subsets of data words stored in the main memory unit of the system and to transfer the selected data words to specified banks of fast-access registers.

BACKGROUND OF THE INVENTION

*Field of the invention*

This invention relates to the selective processing of information signals and more particularly to an improved information processing system characterized by a novel mode of operation designated the selective data access mode.

*Description of the prior art*

Various known information processing systems are adapted to carry out data reordering operations. In a typical such system the data items to be reordered are stored in the main memory unit of the system. These data items may, for example, each constitute a set of information listings (such as name, age, term of employment, number of degrees received, and so forth) for each individual of a group of employees. Illustratively, this set of listings is initially stored in the unit at successive locations in accordance with an alphabetical arrangement of the last names of the employees. In the course of processing the stored information, however, it may be desired to reorder the alphabetical arrangement to provide a new listing ordered on the basis of term of employment or some other characteristic of the group.

In addition, an important application of data selection is in real time systems that must rapidly reorder selected device and input information according to current system states. For example, equipment numbers may have to be selected and reordered according to their dynamically scheduled processing times.

Another important area of application of data selection is in symbol manipulation. For example, constituents of a string of text in a natural or artificial language may be selected and reordered according to syntactic types or other attributes of these constituents.

In addition, procedures for the manipulation of combinatoric graphs, including lists, trees and chains, are extensively used in programming systems and require frequent selective reordering of the data elements.

Furthermore, numerical analysis programs require selective reordering of data, notably in connection with matrix and polynominal computations. In general, many examples of symbolic, numerical and control data reordering operations of practical importance are encountered in the information processing art.

Reordering stored data items and transferring them to a bank of registers included in a processing or computing system may be accomplished in a variety of ways. For example, to load the registers from nonsequential (that is scattered or permuted) memory locations, a separate load instruction may be referenced for each such location.

However, for loading the registers from sequential locations, multiple load instructions of a conventional type are available. Such multiple instructions obviate the need for referencing, accessing, decoding and executing a series of individual load instructions. Additionally, there is available a prior art technique of indirect addressing combined with reference to the contents of an index register which may be combined with the multiple loading technique to achieve a permuted load with only two machine instructions, provided a permutation table is set up in memory for each permutation desired. This prior art technique requires an extra memory reference at the time each data word is fetched. Moreover, this technique does not permit conditional selection of data.

SUMMARY OF THE INVENTION

An object of the present invention is an improved information processing system.

A more particular object of this invention is an improved information processesing system characterized by an efficient, high-speed data-directed mode of operation.

More specifically, an object of the present invention is to modify the information processing system disclosed in my copending application Ser. No. 637,789, filed May 11, 1967, to impart thereto data reordering capabilities of the type described above.

Another object of this invention is to improve the information processing capabilities of the system disclosed in my above-identified copending application, while annexing thereto a minimum amount of additional circuitry.

Still another object of the present invention is to enable selective access to blocks of data words stored in the memory unit of a computer and to enable sequential, conditional and permuted moving of subsets of the data words of such blocks into and out of banks of fast access units including, for example, index registers, accumulators, logic registers, selection registers and peripheral unit control registers.

Briefly, these and other objects of the present invention are realized in a specific illustrative computing embodiment thereof that comprises a modification of the basic selective access machine disclosed in my afore-identified copending application. As modified, the machine includes additional circuitry which makes possible high-speed loading and storing of a group of fast access registers with data retrieved from specified locations in the main memory unit of the embodiment. The additional circuitry includes a so-called selective data access flip-flop and gates controlled by the flip-flop for routing the output of the basic selective access circuitry either to the program instruction location counter (for selective access of instructions) or, in accordance with the principles of the present invention, to an address counter for selective access of data. In the selective access of data mode of operation, another gate controlled by the flip-flop routes Go-Ahead signals from the store access decoder back to the selective access circuitry.

The modified machine is adapted to execute so-called selective load and store instructions. In response to the accessing, decoding and execution of such an instruction, the aforementioned flip-flop is set and the basic selective access circuitry is in effect connected to the address counter and the store access decoder. In addition, when the noted flip-flop is set, various clock pulses are not sent to the gates which control selective access modification of the program instruction location counter and the accessing and decoding of program instructions. This effectively suspends the accessing of program instructions during selective loading or storing. As a result all subsequent machine cycles are interpreted as storage access cycles until such time as the selective data mode of operation is terminated.

At the beginning of the next machine cycle, following execution of a selective load or store instruction, an enable signal is sent to the selective access circuitry. In response thereto selective data access operation commences. The subsequent operation of the selective access circuitry itself is essentially as described in my aforecited copending application, except that it is the address counter and not the program instruction location counter that is selectively modified thereby. Any indicated modification of the address counter takes place rapidly in a small portion of a single machine cycle. Compactly encoded bit-, byte- or jump-mode information determinative of the particular manner in which the address counter is to be modified is stored in the selective access circuitry, as described in my noted copending application.

In response to the operation of the selective access circuitry, the address counter is controlled to reference specified data-containing memory locations. Each referenced location is subsequently accessed and its contents gated via the storage buffer register to a particular register in the bank specified by the selective load instruction. By appropriate encoding of the selection information stored in the selective access circuitry, the referenced data items can be retrieved conditionally or unconditionally from sequential or permuted memory locations and transferred to the specified register bank in a high-speed manner. (In the case of a selective store instruction, data items are moved from the specified register bank to selected memory locations.)

It is a feature of the present invention that an information processing system include high-speed selection circuitry for storing encoded sequences that are used to control the selective accessing of program-determined subsets of data items stored in a main memory.

It is a further feature of this invention that a selective access machine include circuitry responsive to the execution of a selective load or store instruction for connecting the selective access circuitry of the machine to the address counter and store access decoder thereof.

It is another feature of the present invention that the selective access circuitry control the address counter to reference particular data-containing memory locations specified by compactly encoded information stored in the selection circuitry.

It is still another feature of this invention that the circuitry responsive to the execution of a selective load or store instruction be effective to disable selective access modification of the program instruction location counter and the accessing and decoding of program instructions, thereby effectively suspending the accessing of program instructions during selective data movement.

It is still another feature of the present invention that selection push-down circuitry be included for the purpose of suspending and resuming normal selective access whenever a selective load or store instruction is executed while the machine is in the selective access mode. This circuitry is also used to push down selection information during a second-order selective program access sequence.

BRIEF DESCRIPTION OF THE DRAWING

A complete understanding of the present invention and of the above and other objects, features and advantages thereof may be gained from a consideration of the following detailed description of a specific illustrative embodiment thereof presented hereinbelow in connection with the accompanying drawing, in which:

FIGS. 1A, 1B and 1C, when placed side-by-side in the particular manner indicated in FIG. 2, depict a specific illustrative stored-program information processing system made in accordance with the principles of the present invention.

DETAILED DESCRIPTION

Figure 1A:
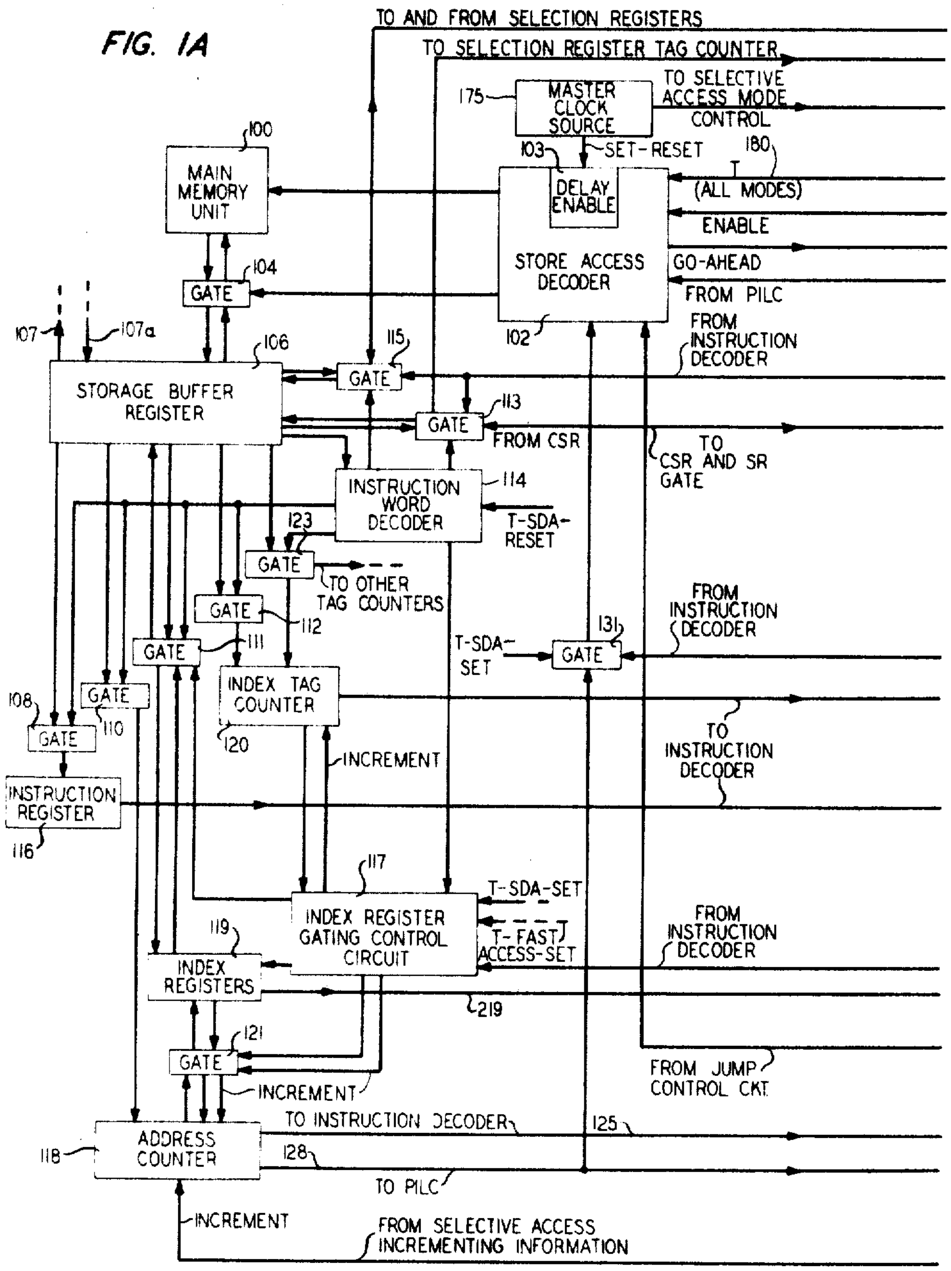
Figure 1B:
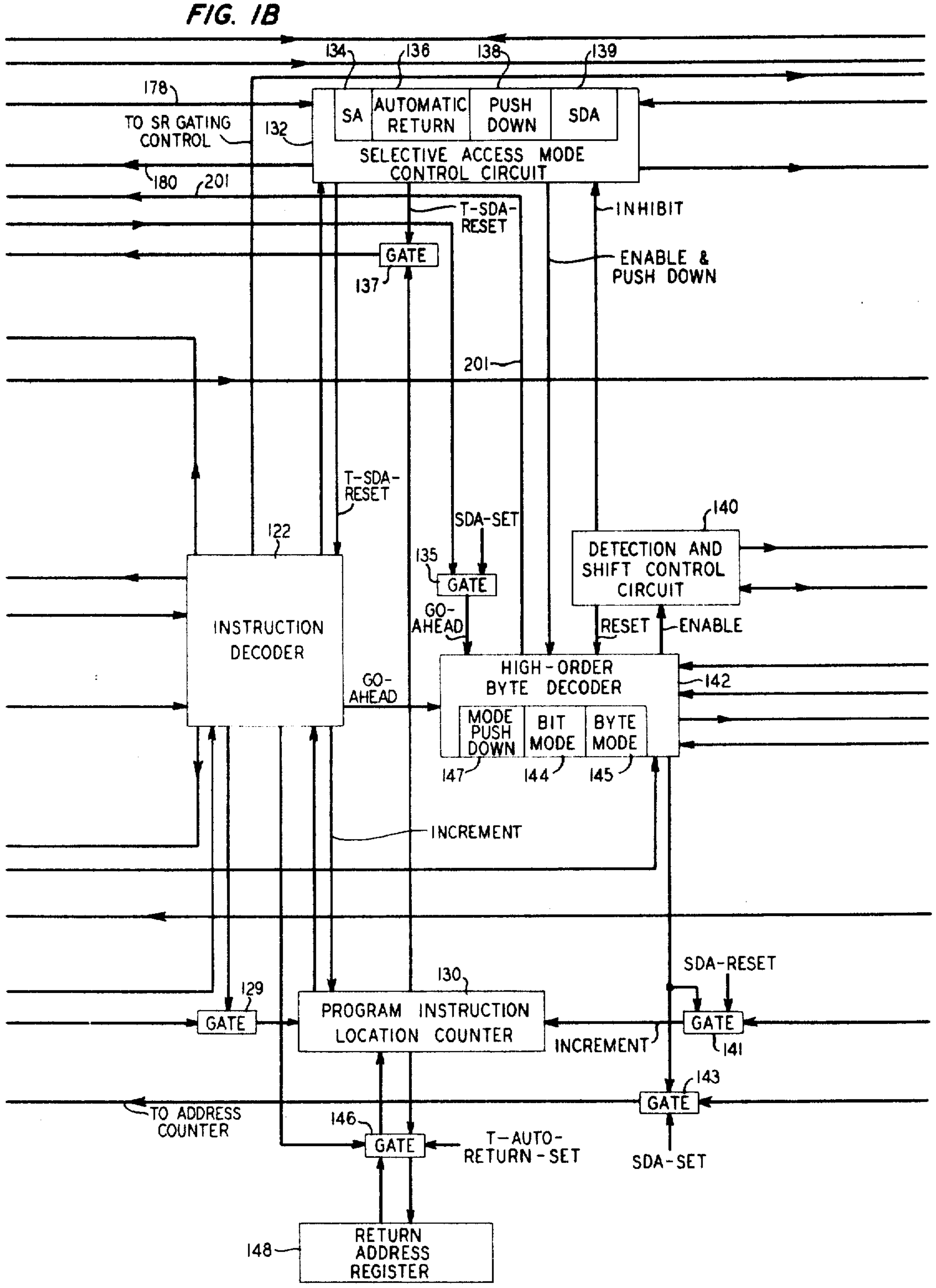

The FIG. 1A portion of the specific illustrative information processing system shown in FIGS. 1A, 1B and 1C includes an addressable main memory unit 100 of the random access type. Although the unit 100 or portions thereof may be of the read-only type, it is represented for illustrative purposes as being a read-write unit. In other words, information may be read out of or written into the memory unit 100 during operation of the depicted processing system. The unit 100 may, for example, be a conventional magnetic core memory adapted to have stored therein at specified address locations a plurality of multidigit binary numbers which may constitute data representations or instruction words.

Access to a particular one of the numbers stored in the memory unit 100 is accomplished by applying the address of the particular number to a store access decoder 102 which includes a delay-enable flip-flop 103 that is controlled by the output of a master clock source 175. When activated to read the memory unit 100, the decoder 102 is effective to access a particular number stored in the unit 100 and to cause that number to be gated (via a bidirectional gate unit 104) to a storage buffer register 106. Data stored in the register 106 may be applied via a lead 107 to associated conventional components (including register 168*a*, FIG. 1C, and other units not shown) of a computing or data processing system. Also, data may be delivered from these associated components to the register 106 via a lead 107*a*. Such delivered data may be then applied to the memory unit 100 via the gate 104 under the control of and to locations specified by the decoder 102. Illustratively, the associated register 168*a* is shown to communicate with the register 106 via the leads 107 and 107*a*.

Under the control of enabling signals applied to gates 108, 110, 111, 112 and 123 from an instruction word decoder 114, selected portions of a number temporarily stored in the buffer register 106 may be respectively gated to an instruction register 116, an address counter 118, a plurality of index registers 119 and an index tag counter 120. The gate 123 is controlled by the decoder 114 to gate an initial tag value to the counter 120, and may also be used to gate an initial tag value to other counters as described below. In addition, the decoder 114 controls the application of information numbers directly from the buffer register 106 via gates 113 and 115 to later described components of the illustrative system.

FIG. 1A also includes an index register gating control circuit 117 which is adapted to route information from the storage buffer register 106 to a specified one of the index registers 119 and to control, via a gate 121, the flow of information between the registers 119 and the address counter 118. Signals determinative of which index register is to be involved in each such transfer are supplied to the circuit 117 from the counter 120. Additionally, the circuit 117 is arranged to supply incrementing signals directly to the counter 120 and to supply such signals to the counter 118 via the gate 121. In turn, the circuit 117 is controlled by the instruction word decoder 114 and an instruction decoder 122 (FIG. 1B) as well as by timing signals whose source and nature will be described below.

The contents of the instruction register 116 shown in FIG. 1A are applied to the instruction decoder 122 of FIG. 1B. The contents of the address counter 118 are applied via a lead 128 and a gate 129 to a program instruction location counter 130 shown in FIG. 1B. Also the output of the counter 118 is applied via a lead 125 to the instruction decoder 122. Additionally, the output of the counter 118 is applied to a gate 131 which is controlled by the instruction decoder 122 (and by timing signals) to apply the address of the operand portion of an instruction word to the decoder 102. In that way a specified data word may be retrieved from the memory unit 100 and gated to the storage buffer register 106.

The individual system components shown in FIGS. 1A and 1B and described so far are conventional in nature. Furthermore, the interconnections among these particular components, as well as their overall mode of operation, are also conventional. In structure and function these components may, for example, be identical to the corresponding units included in the general-purpose stored-program computer described in J. L. Brown Patent 3,036,773, issued May 29, 1962. Alternatively, these components may be structured in accordance with the teachings contained in a copending application, Ser. No. 334,875, filed Dec. 31, 1963 in the names of A. H. Doblmaier, R. W. Downing, M. P. Fabisch, J. A. Harr, H. F. May, J. S. Nowak, F. F. Taylor and W. Ulrich.

Referring again to FIG. 1B, there is shown a selective access mode control (SAMC) circuit 132 which includes four indicators: a selective access (SA) flip-flop 134, an automatic-return flip-flop 136, a push-down flip-flop 138 and a selective data access (SDA) flip-flop 139. Also shown in FIG. 1B are a detection and shift control circuit 140, a high-order byte decoder 142 which includes a bit-mode flip-flop 144, a byte-mode flip-flop 145 and mode push-down flip-flops 147, gates 135, 137, 141, 143 and 146 and a return-address register 148.

FIG. 1C depicts a block 150 which represents a plurality of high-speed fast-access selection registers. For illustrative purposes herein it will be assumed that the block 150 includes thirty-one 16-bit registers. Binary sequences are applied to the registers 150 via a gate 152 that is controlled by a selection register gating control circuit 154. The circuit 154 also serves to identify the particular selection register to which a binary sequence is to be applied.

Binary sequences can be moved between the selection registers 150 and a 16-bit controlling selection register 156 via a gate 158 which is also controlled by the selection register gating control circuit 154. (For ease of reference, the digit positions of the register 156 are numbered from 1 through 16.) The contents of the controlling selection register 156 can also be saved in a selection push-down register 151 and restored to the register 156 via a gate 153, under control of the SAMC circuit 132.

Connected to the controlling selection register 156, hereinafter referred to as the CSR, are gates 160 and 162, a termination and next-selection-register (NSR) control circuit 164, a compare circuit 166 and a jump control circuit 168. In addition, a complement circuit 170 is connected to the gate 160, a selection register tag counter 172 is connected to the gate 162, and the associated register **168*a* is connected to the circuit 168 and to the decoder 142**.

The specific illustrative system shown in FIGS. 1A, 1B and 1C is capable of operating in various different modes. First, the system may operate in a straightforward manner as a conventional general-purpose stored-program computer. Second, the system has the capability to operate as a basic selective access machine of the type described in my aforementioned copending application. Third, in accordance with the principles of the present invention, the depicted system is adapted to operate in the herein-specified selective data access mode. It is noted that the basic selective access mode and the selective data access mode can be considered to be independent. Accordingly, it is to be understood that a conventional computer can if desired be modified to include only one of these selective access capabilities. However, it is generally more efficient (requiring relatively little additional circuitry) to impart both unique capabilities to a conventional machine. Hence the machine depicted and described herein is of a composite type having both conventional selective access and selective data access capabilities.

To configure the system depicted in FIGS. 1A, 1B and 1C to operate in a particular mode (that is, in the normal, selective access or selective data access mode) various timing signals are applied to specified components of the system. All such signals emanate from the SAMC circuit 132 which in turn is clocked by the output of the master source 175. Signals from the SAMC circuit are of several kinds. A lead labeled T, T-SDA, SDA or T-AUTO-RETURN is to be understood herein as originating from the circuit 132. More specifically, a lead labeled T (ALL MODES) is to be understood to carry regularly recurring timing signals from the SAMC circuit 132 in all three aforementioned modes of operation. A lead marked T-SDA-SET carries regularly recurring timing signals only when the SDA flip-flop 139 is set. A lead labeled T-SDA-RESET carries regularly recurring timing signals only when the SDA flip-flop is reset. A lead marked SDA-SET carries a continuous signal when the SDA flip-flop is set. A lead marked SDA-RESET carries a continuous signal when the SDA flip-flop is reset. A lead marked T-AUTO-RETURN-SET carries a gating signal on termination of selective access if the automatic-return flip-flop 136 is in its set condition, as described in my cited copending application.

As indicated in FIG. 1B and in view of the conventions specified above, the timing or enabling signals applied to the gates 141 and 143 from the SAMC circuit 132 are continuous in nature and are derived from the reset and set outputs respectively of the SDA flip-flop 139. These continuous signals serve in effect as selectors for determining which counter (program or address) is to be controlled by the selective access circuitry. The selective access circuitry itself operates asynchronously and is effectively timed by the GO-AHEAD pulses which come to the decoder 142 from the instruction decoder 122 (in the basic selective access mode) or from the store access decoder 102 (in the selective data access mode characteristic of the present invention). The delay-enable flip-flop 103 and the INHIBIT lead from the detection and shift control circuit 140 to the SAMC circuit 132 serve to resynchronize the system, as explained in my copending application.

The specific illustrative system shown in FIGS. 1A, 1B and 1C operates in clocked machine cycles. Each such cycle is at different times either an instruction cycle or a data cycle. If the execution of an instruction causes data to be retrieved from the memory unit 100, the cycle associated with the execution of the instruction is followed by a data cycle, as determined by the instruction decoder 122. If, however, no data from the unit 100 is required by an instruction (for example, an operation involving only data already stored in high-speed registers) its instruction cycle is directly followed by another instruction cycle in a conventional way.

In accordance with the principles of the present invention, the execution of a so-called selective load (or store) instruction (to be described below) causes the SDA flip-flop 139 to be set. In response thereto, enabling signals are not sent to the gates 137 and 141 which control selective access modification of the program instruction location counter 130 and the accessing and decoding of program instructions. In effect this suspends the accessing (either normal or selective) of program instructions during selective loading. Accordingly, all subsequent machine cycles are data (store-access) cycles until such time as a termination signal is received by the SAMC circuit 132.

Figure 3:
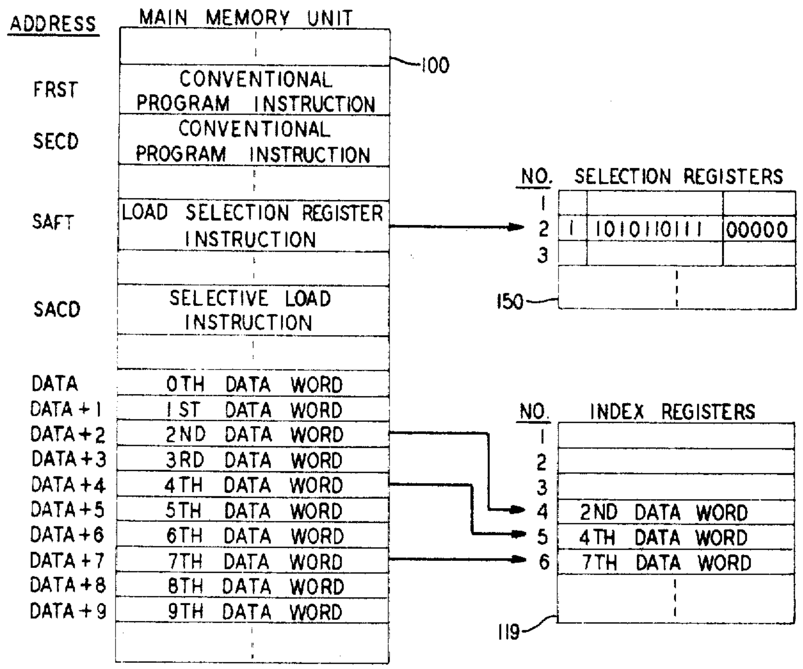
FIGS. 3 and 4 are symbolic representations of portions of the main memory and specified register units of the illustrative system.

The mode of operation of the specific illustrative system shown in FIGS. 1A, 1B and 1C can best be described with the aid of FIG. 3. The upper and lower right-hand blocks in FIG. 3 respectively represent the selection registers 150 and the index registers 119. The left-hand block represents a section of the main memory unit 100 shown in FIG. 1A. This last-mentioned block contains conventional program instructions of a type that would typically be encountered in the operation of a general-purpose stored-program computer. These conventional instructions are stored at the memory locations or addresses designated FRST and SECD. In accordance with the principles of the present invention, the unit 100 also has stored therein instructions which are unique to the selective data access operation to be described in detail herein. The nature and effect of these latter instructions which are stored at the memory locations designated SAFT and SACD will be described later below.

Also stored in the memory unit 100 represented in FIG. 3 (at the addresses designated DATA through DATA+9) are tendata words. In the first specific example of selective data access given below, the data words stored at DATA+2, DATA+4 and DATA+7 will be transferred to index registers 4, 5 and 6, respectively, as indicated by the arrows between the blocks 100 and 119. In this connection, it is emphasized that the index registers have been selected as the destination for the data words for illustrative purposes only. In accordance with this invention, the contents of selected data locations can be moved to or from any group of registers included in or associated with the depicted system, including those selection registers not used to control the currently executing selective data operation.

To illustrate the mode of operation of the specific system shown in FIGS. 1A, 1B and 1C, assume that the instruction location counter 130 initially contains therein the address FRST which is the location in the memory unit 100 of the first one of the conventional program instructions represented in the left-hand block of FIG. 3. The start of a complete system or machine cycle is then commenced by the application of a timing signal from the master clock source 175 to the SAMC circuit 132 via a lead 178. If neither the SA flip-flop 134 nor the SDA flip-flop 139 is set (thereby respectively indicating that the depicted system is not at the time in the basic selective access mode or in the selective data access mode) the circuit 132 responds to the noted timing signal in a normal way by applying an enabling signal via a lead 180 to the store-access decoder 102. (The manner in which the SA flip-flop 134 is set and reset and the resulting mode of operation of the system if the flip-flop 134 is in its set condition are described in my copending application.)

The enabling of the store access decoder 102 causes it to reference the particular location in the main memory unit 100 specified by the program instruction location counter 130. As indicated above, the counter 130 initially contains therein the representation FRST. Hence the decoder 102 accesses the information (instruction) stored at that address in the unit 100. Next the contents of FRST are gated to the storage buffer register 106 via the gate 104. Thereafter standard decoding and execution of the retrieved instruction are carried out. Other conventional components such as, for example, accumulator and multiplier-quotient registers and adders (not depicted in FIGS. 1A, 1B and 1C) may be interconnected to and cooperate with the depicted system to execute the specified instruction in a straightforward manner known in the art. (The associated register 168*a* is illustratively included as representative of such components.)

Accessing, decoding and execution of the subsequent conventional program instruction stored at the address designated SECD in FIG. 3 occur in a manner identical to that described above. Eventually the instruction stored at the address SAFT is encountered. In the particular example considered below, this instruction is directed to loading one of the selection registers 150 with a specified data representation. The particular manner in which such an instruction accomplishes this loading is described in my copending application. Various other ways of loading the registers 150 are also described therein.

Assume for purposes of a specific example that the following 16-bit sequence, whose digits are numbered as shown below, is loaded into selection register No. 2 in response to the execution of the instruction stored at SAFT in FIG. 3.

| | | | | | | | | | | | | | | | | |
|---|---|---|---|---|---|---|---|---|---|---|---|---|---|---|---|---|
| Bit Position | 1 | 2 | 3 | 4 | 5 | 6 | 7 | 8 | 9 | 10 | 11 | 12 | 13 | 14 | 15 | 16 |
| Bit Value | 1 | 1 | 0 | 1 | 0 | 1 | 1 | 0 | 1 | 1 | 1 | 0 | 0 | 0 | 0 | 0 |

In FIG. 3 selection register No. 2 is represented as being loaded with the particular 16-bit sequence listed in (1).

In accordance with the disclosure of my copending application, the left-most digit position of the 16-bit sequence shown in (1), and of each of the other numbers stored in the selection registers 150, contains a so-called mode indicator bit. Illustratively, a "1" representation in digit position No. 1 is interpreted as specifying bit-mode operation. (In an alternative encoding, not illustrated, digit position No. 2 is used to distinguish bit-mode from byte-mode, if digit position No. 1 contains a "1." A "0" signal in digit position No. 1 signifies jump-mode operation.) In bit-mode selective access the next ten bits of the sequence stored in a selection register are interpreted as constituting the selection field thereof. (In byte- and jump-mode selective access these same ten bits are interpreted in different ways, as described in my copending application.) In bit-mode selective access (also in byte- and jump-mode selective access) the last or right-most 5 digit positions specify the number of the next selection register in the block 150 to be referenced. More complete details concerning bit-, byte- and jump-mode selective access operation are specified in my copending application.

Counting down the stored listing depicted in the left-hand block of FIG. 3 and remembering that selection register No. 2 has been loaded with representation (1) above, assume that the instruction stored at the address designated SACD has been reached in the course of normal instruction-by-instruction operation of the system shown in FIGS. 1A, 1B and 1C. The instruction stored in the memory unit 100 at SACD is a selective load instruction of the type encompassed within the principles of the present invention. For illustrative purposes, assume that the instruction stored at SACD is a selective load indexes (SLX) instruction having the following exemplary format.

SLX ADDRESS, TAG (optional), INITIAL
TAG VALUE, SEL REG NO (2)

When an instruction of this unique type is executed, either in the normal mode or in the basic selective access mode, the following actions take place:

(1) The address specified by the number in the ADDRESS field is gated to the address counter 118.

(2) The number in the optional TAG field is gated to the index tag counter 120. If the tag is nonzero, the value of the indicated index register is added to the contents of the counter 118.

(3) The number in the INITIAL TAG VALUE field is gated to the tag counter, via the gate 123, for the specified group of registers. In this example the initial tag value is gated to the index tag counter 120. This value may be gated to other tag counters, as discussed below.

(4) If the SA flip-flop 134 is not set, step 4a (below) takes place immediately. If the SA flip-flop is set, the following actions take place:

(i) The contents of the CSR 156 are gated to the selection push-down register 151.

(ii) The mode push-down flip-flops 147 are set according to the states of the bit- and byte-mode flip-flops 144 and 145. Then the flip-flops 144 and 145 are both reset.

(4a) The contents of the selection register specified in the SEL REG NO field are gated to the controlling selection register 156.

(5) The SDA flip-flop 139 is set. As specified above, this causes the selective access circuitry shown in FIG. 1C to be connected to the address counter 118. This is accomplished by having the SAMC circuit 132 send a continuous signal to the gates 135 and 153, such signal being applied thereto during basic machine cycles when the flip-flop 139 is set.

Furthermore, when the flip-flop 139 is set, various timing and enabling signals are not set to the decoder 122 and the gates 137 and 141 that control selective access modification of the program instruction location counter 130 and the accessing and decoding of program instructions. By this means the accessing of program instructions is suspended during selective loading (or storing).

Note that during the execution of the SLX instruction, the decoder 122 does *not* send a GO-AHEAD signal to the high-order byte decoder 142. Since no further instructions are executed during selective data access, no signals are sent from the decoder 122 until selective data access is terminated.

(6) At the beginning of the next machine cycle, an enable signal is sent from the SAMC circuit 132 to the high-order byte decoder 142 and selective data access begins. The operation of the selective access circuitry is as described in my aforementioned copending application, with the following differences:

(a) The address counter 118 is incremented (or decremented) rather than the program instruction location counter 130.

(b) The Go-Ahead signal is sent to the decorder 142 from the store access decoder 102 rather than from the instruction decoder 122.

(c) Instruction accessing, decoding and execution are disabled as described in step No. 5 above. As a result, the address counter 118 is modified by the selective access circuitry.

(7) After this modification, which takes place rapidly as described in my copending application, the memory location referenced by the counter 118 is accessed and its contents gated to the storage buffer register 106.

(8) A Go-Ahead signal is sent from the decoder 102 to the high-order byte decoder 142, and selective access proceeds.

(9) The contents of the storage buffer register 106 are gated to the particular register referenced by the tag counter of the register group specified by the selective load instruction. (In the examples herein, the index tag specifies which index register shall be loaded.)

(10) The tag counter (here, the index tag counter 120) is stepped by one.

(11) During steps 9 and 10 selective access has been underway. Termination, bit-mode completion, bit-mode continuation or next-selection-register gating may take place as described in my copending application. If there is no termination, step No. 7 above repeats.

(12) If there is termination of selective data access (indicated by a zero next-selection-register field in the controlling selection register 156) then the SDA flip-flop 139 is reset, and either normal or selective accessing of program instructions proceeds at the location referenced by the program instruction location counter 130. If the SA flip-flop 134 is set at the termination of selective data access, this indicates that selective accessing of program instruction locations had been in process before the SDA operation just completed. In this case, the contents of the selection push-down register 151 are restored to the CSR 156, and the states of the bit- and byte-mode flip-flops 144 and 145 are set according to the mode flip-flops 147. Then a resume signal is sent to the decoder 142 and selective access resumes.

When the SDA flip-flop 139 is reset, the SAMC circuit 132 sends appropriate timing signals to the following units:

(a) The instruction word decoder 114.

(b) The instruction decoder 122.

(c) The gate 137 interposed between the program instruction location counter 130 and the store access decoder 102.

(d) The gate 141 interposed between the basic selective access circuitry and the counter 130.

Further, when the SDA flip-flop 139 is reset, the SAMC circuit 132 does *not* send timing signals to the following units.

(e) The gate 131 interposed between the address counter 118 and the store access decorder 102. (However, the instruction decoder 122 may send such signals in a conventional manner.

(f) The gate 143 interposed between the basic selective access circuitry and the address counter 118.

(g) Via the index register gating control circuit 117 to the low-order bit of the specified tag counter (see step No. 10).

(h) Via the index register gating control circuit 117 to the gate 111 connected between the storage buffer register 106 and the register referenced by the specified tag counter 120. (Of course the instruction decoder 122 may send such signals in a conventional manner.)

To return to the specific selective data transfer operation represented in FIG. 3, assume that the instruction stored at SACD in the memory unit 100 has the following particular form

SLX DATA, 4, 2 (3)

In conformity with the generalized format (2) set forth above, it is apparent that instruction (3) specifies a selective load of data words *from* the DATA block in the memory unit 100 *to* the index registers 119, with an initial index tag value of 4. Furthermore, the selective data transfer operation is specified by instruction (3) as being controlled by the contents of selection register No. 2. Accordingly, in response to instruction (3), loading takes place from selectively accessed data locations of the main memory (beginning at the address DATA) to the index registers 119 (starting with index register No. 4) until the selective data access operation is terminated.

The particular data-containing locations to be accessed in response to instruction (3) are sepcified by the digits in the bit selection field of the bit-mode encoded information stored in selection register No. 2. As indicated in (1), this 10-bit field contains "0's" in digit positions corresponding to the addresses DATA+2, DATA+4 and DATA+7. Hence it is the data words stored at these particular locations that are referenced by the counter 118, accessed by the decoder 102 and gated to the 4th, 5th and 6th index registers respectively in the register bank 119. Subsequently, since the next-selection-register field of the specified sequence represented in (1) is zero, the abovedescribed selective data access operation terminates.

It is significant that in achieving data reordering the herein-described bit-mode selective data access technique is more efficient than the aforenoted prior art indirect addressing method. This is so because bit-mode operation is characterized by an encoding that is more compact for dense selections from small data blocks than is the full-address encoding required in the indirect addressing approach.

In the specific example described above and represented in FIG. 3, the selection bit technique could not achieve a permuted selection. To obtain a permuted selection, it is necesary either to use some jump-mode selection or to execute an instruction that modifies the contents of the address counter. A further use of jump-mode encoding is to perform selective data access on "sparse" data blocks (for example, blocks having more than ten words between selected items).

Figure 4:
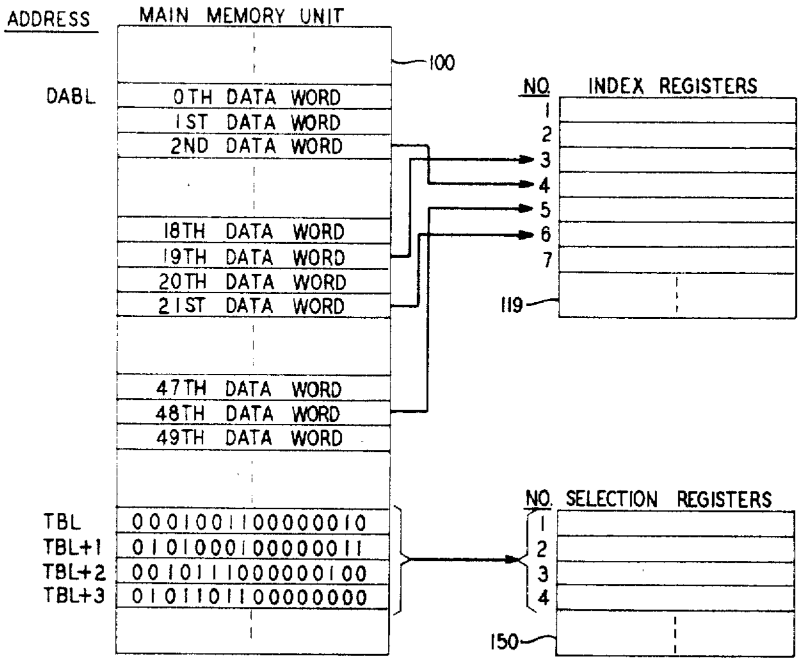

To perform permuted selective data access with jump-encoded information, in accordance with the principles of the present invention, a table of jump amounts is needed. Such a table is represented in FIG. 4 as being stored in the main memory unit 100 at the address designations TBL through TBL+3. In accordance with the conventions specified in my copending application, it is apparent that the signed jump amounts and next-selection-register values respectively stored at the addresses TBL through TBL+3 are +19, 2; −17, 3; +46, 4; and −27, 0. These particular values are established to obtain the desired large jumps and permuted selection order. Specifically, these values are designed to be utilized to load the 19th, 2nd, 48th and 21st data words of the block stored at DABL into consecutive index registers beginning with index register No. 3. To do this requires two instructions (not shown in FIG. 4) which need not be contiguous. These instructions are

LSR TBL, 1, 4
SLX DABL, 3, 1 (4)

The first one of the instructions listed in (4) is effective to load selection registers 1 through 4 with 16-bit quantities from the memory block at TBL. The next-selection-register fields of these quantities are adapted to achieve the desired jump and terminate sequence.

The second instruction in (4) causes loading of the selected data words in the selective data access mode of operation, as controlled by selection register No. 1 and subsequent selection registers indicated in the next-selection-register fields thereof. Loading is from selected data words of the block beginning at DABL to the index registers 119 (beginning with index register No. 3) until termination of selective data access is signaled to occur.

It is important to note that pump-encoded selection information of the type specified above can remain in the selection registers 150 for future use without reloading of these registers, and that fast multiple loading techniques (for example, double-word access and packing of jump-encoded information) may be used to speed up the multiple loading of the selection registers. In other words, rapid multiple loading techniques may be used to further increase the efficiency of the jump-mode selective data access operation described herein. For instance, by changing only the next-selection-register fields of the selection registers 150 and by loading these fields at 6 or 7 per store word (depending of course on word length) it is possible to achieve variations on a permutation with only one additional memory reference for each 6 or 7 jump amounts. Similarly, it is feasible to load jump amounts packed 4 or 5 to a word with similar results.

In summary, there has been described herein a particular exemplary arrangement adapted to selectively access sequential or permuted subsets of data words stored in the main memory unit of the arrangement and to move the selected data words to banks of fast-access units including counters, index registers, accumulators, logic registers, peripheral unit control registers, and, significantly, selection registers. In particular, the arrangement is adapted to execute selective load instructions. Execution of such an instruction is effective to suspend the accessing of program instructions during selective loading and to condition the arrangement for selective data access operation. During selective data access operation, modifications of the address counter are controlled to occur. Any such modification takes place in a small portion of a single machine cycle. Compactly encoded bit-, byte- or jump-mode information determinative of the particular manner in which the address counter is to be modified is stored in high-speed selective access circuitry.

The combined use of selective data access with the selective access of program locations is of special importance. Unusual flexibility of operation can be achieved by executing selective data access instructions under selective program access control. In this way, a second-order selection of data is accomplished: The subset of selective data access instructions specified by selection information in turn specifies a particular set of selections of data. For example, five out of ten combinations of a given data set may be loaded consecutively into an index register bank by selecting a subset of a set of selective load instructions.

Still more flexibility is attained by selectively loading selection registers. This process, in turn, can be under selective access control, thus making it possible for a selectively accessed routine to selectively modify its own selection information. To do this, selective load instructions *that use selection registers as the receiving data bank* are selectively accessed. When each selective data access terminates, under these conditions, the states of the selection registers will have been modified by the selectively loaded data. Then, selective program access resumes under modified conditions.

To achieve this flexibility, the saving or pushing-down of selection information is essential. This technique is specifically implemented in the herein-described illustrative system for the purpose of selectively accessing selective data access instructions. The same implementation can be used in a straightforward way to implement the selective access of selective access instructions. The actions described in steps 4 and 12 above with respect to saving and restoring selection information can be adapted to this purpose by simply having the push-down flip-flop 138 play the role of the SDA flip-flop 139. That is, in the case of second-order selective program access, the push-down flip-flop serves to indicate whether or not restoring of selection information is to take place.

The series of actions that actually implement such a push-down operation follows: Suppose that, during selective program access, a TSA or ESA instruction is selected and executed as described in my copending application. Since selective access is under way, the SA flip-flop has been set.

(1) The push-down flip-flop 138 is set. (If it is already set, it remains in that condition.)

(2) The contents of the CSR 156 are gated to the selection push-down register 151.

(3) The states of the bit- and byte-mode flip-flops 144 and 145 are recorded in the mode push-down flip-flops 147; the flip-flops 144 and 145 are then reset.

(4) The new selective access sequence then proceeds as described in my copending application.

On termination of selective program access, the actions are:

(5) If the push-down flip-flop 138 is reset, termination proceeds as described in my copending application. If the flip-flop 138 is set, the contents of the selection push-down register 151 are restored to the CSR 156.

(6) The bit- and byte-mode flip-flops 144 and 145 are set according to the states of the mode push-down flip-flops 147. The flip-flops 147 and 138 are then reset.

(7) The high-order byte decoder 142 is enabled and the former selective access sequence resumes.

In order to have more than one level of push-down it is useful to include a *load push-down* instruction in the repetoire of the illustrative system. Upon execution of this instruction, the contents of the memory location referenced by the instruction are gated to the selection push-down register 151, and the push-down flip-flop 138 is set. Advantageously a *store push-down* instruction is also included. By using these two instructions, selection information may be saved for an arbitrary number of selective access initiations.

Furthermore, in accordance with the principles of the present invention, it is advantageous to extend and modify the known technique of loading an entire subroutine from main memory into fast-access memory and then rapidly executing the instructions of the subroutine. The unique extension and modification of this idea involves loading such a subroutine *selectively* into a fast-access data bank and then executing the selected instructions which are then in consecutive locations in the bank. The registers 119, and the counter 120 and the circuit 117 associated therewith (shown in FIG. 1A), are well suited to be employed as subroutine registers, a subroutine tag counter and a subroutine register gating control circuit, respectively. In this case the gate 111 is effective to gate subroutine instructions from the subroutine registers 119 to the storage buffer register 106 under control of the subroutine register gating control circuit 117. Once in the storage buffer register 106 these instructions can be executed in the normal way. In addition, timing signals are applied to the subroutine gating control circuit 117 whenever a fast-access indicator (not specifically shown in the drawing) included, for example, in the selective access mode control circuits 132 (FIG. 1B) has been set under program control. These signals are effective to cause gating of the subroutine instructions to the storage buffer register 106, as mentioned, and also to increment the subroutine tag counter which serves as a fast-access program counter.

In practice, a subroutine bank of fast-access registers is necessarily limited in size. By loading this bank with instructions selected from a larger generalized routine in a main memory, *using selective data access*, efficient spatial use is made of the fast-access subroutine store. Furthermore, by eliminating unwanted instructions with selective data access, the selected set loaded into the data bank is also efficient in time. The loaded subroutine will execute more rapidly because unwanted instructions have been previously eliminated.

In carrying out the subroutine selection technique described above the desired subset of the subroutine is selected in its entirety before execution. Conditional selective access, both byte and jump, is still of significant use but has a different effect. The conditions tested are all those that hold before execution of the selected instruction set. By contrast in basic selective access, the conditions take effect dynamically; that is, as selected instructions are executed they may change the tested conditions.

It is noted that basic selective access may, of course, be used with a fast-access subroutine store with minor and straightforward modifications of the original selective access apparatus. Moreover it is noted that the basic selective access technique and the selective data access technique described herein can be combined. Specifically, a selectively loaded routine can in turn be selectively accessed while in its fast-access location. This yields in effect a subset of a subset of a generalized routine.

Many variations and modifications of the specific illustrative system described above, and of the mode of operation thereof, are within the skill of the art. For example, all the various alternative techniques described in my aforenoted copending application may be embodied in the herein-considered system.

In addition, so-called selective store instructions are encompassed within the scope of the principles of the present invention. Such an instruction is executed exactly like a selective load instruction except that data is moved thereby *from* a group of fast-access registers (for example, the index registers 119) *to* selected addresses in a storage block in the main memory unit 100. The selective store mode of operation allows several different selections of data (located, for example, in the index registers) to be stored in several different selected locations in different data blocks. By the use of selective store instructions, the capability of the selective data mode to achieve desired reordering of specified data is enhanced.

It is also noted that the conditional access provided in byte- and jump-modes as described in my copending application gives a novel flexibility to selective data access. In these modes, accessing of data is conditional on states of devices within the machine in ways that heretofore required additional accessing and execution of the various kinds of test instruction. With selective data access it is possible to select individual data items depending on the states of the accumulators, index registers and so forth without accessing any test instructions. The role of such test instructions is compactly filled by selection information.

The individual components included in the illustrative system described herein are conventional in nature. Direct counterparts of these components can be found in a general-purpose stored-program computer of the type described in the aforecited Brown patent or in an electronic switching system of the type described in the noted Doblmaier et al. application. The structure of the components shown in FIGS. 1A, 1B and 1C is considered, in view of the specific functional end requirements therefor set forth herein, to be clearly within the skill of the art.

Alternatively these components can be simulated in a straightforward way by suitable programming of a computer.

Finally, it is to be understood that the above-described arrangements are only illustrative of the application of the principles of the present invention. In accordance with these principles, numerous other arrangements may be devised by those skilled in the art without departing from the spirit and scope of the invention. In particular, various subsystems may be omitted where they would not be economic for an intended use. For example, the push-down capability, or some of the selection modes, registers or tags, could be omitted in some applications.

What is claimed is:

1. Apparatus adapted to access and retrieve a selected subset of a set of data words stored in a main memory unit, said apparatus comprising program-variable selection register means for storing selection code information, address counter means, selection decoding means responsive to the information stored in said selection register means for controlling said counter means, without a reference to said main memory unit, to reference selected ones of the data words of said set, and means responsive to representations established in said counter means for accessing and retrieving said selected data words and applying them to banks of register units, thereby to achieve selective data loading of said units.

2. A combination as in claim 1 wherein said accessing, retrieving and applying means includes store access decoder means interposed between said address counter means and said main memory unit, and storage buffer means interposed between said memory unit and said register units.

3. A combination as in claim 2 further comprising means including said main memory unit for applying selection code information to said register means.

4. A combination as in claim 3 still further comprising first gating means interposed between said selection decoding means and said address counter means, and control means settable in response to the accessing, decoding and execution of a selective data access instruction stored in said main memory unit for enabling said first gating means.

5. A combination as in claim 4 still further including means responsive to the setting of said control means for suspending the accessing of program instructions stored in said main memory unit during said selective loading operation.

6. A combination as in claim 5 further including program instruction location counter means, and wherein said suspending means includes second gating means interposed between said selection decoding means and said program instruction location counter means, and means responsive to the setting of said control means for disabling said second gating means.

7. A combination as in claim 6 wherein said suspending means further includes third gating means interposed between said program instruction location counter means and said store access decoder means, and means responsive to the setting of said control means for disabling said third gating means.

8. A combination as in claim 7 further including fourth gating means interposed between said address counter means and said store access decoder means, and means responsive to the setting of said control means for enabling said fourth gating means.

9. A combination as in claim 8 further including instruction decoder means connected to said fourth gating means, and means responsive to the setting of said control means for disabling said instruction decoder means.

10. In combination, a memory unit for storing data words and a selective data access instruction word, address counter means for storing representations which respectively reference stored words, means storing compactly encoded selection information, selective access control means, register means for storing selected data words, means responsive to the accessing, decoding and execution of said selective data access instruction word for setting said control means to a unique indication, means responsive to said control means having been set to said unique indication for decoding the selection information in said storing means and for accordingly controlling said address counter means to reference selected data words, and means responsive to representations established in said address counter means for retrieving data words respectively referenced thereby and for routing said selected words to said register means.

11. An information processing system adapted to access selected subsets of sets of data words which are stored in a memory unit of said system, said system comprising address counter means capable of referencing said data words in a word-by-word manner in successive system cycles, first means connected to said memory unit and responsive to the referencing of a data word by said address counter means for accessing and retrieving the referenced data word, program-variable second means for registering a coded data representation definitive of which of said stored data words are to be selected for accessing and retrieval, and third means responsive to the representation contained in said second means for causing said address counter means to respectively reference only the selected ones of said data words in successive system cycles.

12. In combination in an information processing machine, an address counter for referencing a memory unit, means for controlling the stepping of said counter without reference to said unit to determine the amount of such stepping, and program-variable means registering a coded compact data representation and connected to said controlling means for specifying whether said counter is to be stepped or not and, in the event that stepping is indicated, the amount of such stepping, whereby these controlling and stepping actions consume a sufficiently small portion of a cycle of said machine to allow for the accessing and retrieval of a data word referenced by said counter in the balance of the machine cycle.

13. In combination in an information processing system, address counter means, a main memory unit for storing a set of data words which are to be selectively accessed, means storing selection information, and means responsive to said stored selection information for testing any conditions specified thereby and for controlling said counter means to reference selected ones of said data words if the respective selection thereof is specified to be unconditional or if the condition associated therewith is met.

14. In combination in an information processing system, a main memory unit, fast-access banks of registers for storing data words and compactly-encoded selection code information, means for applying data words and selection code information to said registers, address counter means for referencing locations in said main memory unit, selection decoding means responsive to the selection code information contained in said registers for selectively establishing representations in said address counter means, and means responsive to the representations selectively established in said address counter means for routing the data words stored in said registers to those locations in said main memory unit that are referenced by said address counter means.

15. A combination as in claim 14 wherein said applying means includes said main memory unit.

16. In combination in an information processing system that includes a main memory unit, first means indicative of whether or not said system is operating in a selective access mode of operation characterized by selection code information stored in a selection register, selection push-down register means, second means responsive to said first means indicating that said system is operating in a selective access mode of operation and responsive to the execution of a subsequent selective access instruction retrieved from said memory unit for causing the selection code information stored in said selection register to be transferred to said push-down register means, and third means responsive to the termination of the selective access mode of operation initiated by said subsequent instruction for causing said selection information stored in said push-down register means to be restored in said selection register.

17. A combination as in claim 16 further including means for decoding the selection code information stored in said selection register, said decoding means including a bit-mode flip-flop, a byte-mode flip-flop and mode push-down flip-flops, and wherein said second means includes circuitry responsive to a multiple-level selective access operation for setting said mode push-down flip-flops in accordance with the states of said bit- and byte-mode flip-flops.

18. A combination as in claim 17 wherein said first means includes a selective access mode control circuit having selective access and selective data access flip-flops therein which when set respectively indicate that said system is in the selective access and selective data access mode of operation.

19. In combination in an information processing system, means for storing compactly-encoded selection code information, push-down register means, means for transferring selection code information bidirectionally between said storing means and said register means, a main memory unit, and means connected to said unit for controlling the bidirectional transfer of selection code information between said unit and said register means, whereby said system is characterized by multiple levels of push-down operation in which selection code information can be saved for an arbitrary number of selective access initiations.

20. In combination in an information processing system, a main memory unit for storing a plurality of selective load instructions which reference selected data items, a plurality of selection registers storing compactly-encoded selection code information, and means responsive to said selection code information for selectively accessing said instructions and for transferring the selected data items referenced thereby to a data register bank specified by said load instructions.

21. A combination as in claim 20 wherein the specified register bank comprises the selection registers themselves.

22. A combination as in claim 21 wherein said means responsive to said selection code information includes means for transferring information stored in said selection registers to locations in said main memory unit specified by particular portions of the selection code information stored in said selection registers.

23. In combination in an information processing system,
- first and second storage means,
- means for storing compactly-encoded selection information,
- and means responsive to said selection code information for referencing data items stored in said first storage means and transferring said referenced items to particular locations in said second storage means specified by said selection code information.

24. In combination in an information processing system,
- a main memory unit having a set of locations for storing the respective instructions of a subroutine,
- a fast-access memory unit,
- and means for accessing particular ones of said subroutine instructions in accordance with a selective data access mode of operation and for loading said particular instructions into said fast-access memory unit.

25. A combination as in claim 24 further including means for executing the particular instructions loaded into said fast-access memory unit.

26. A combination as in claim 25 wherein said executing means comprises means for accessing the instructions contained in said fast-access memory unit in accordance with a selective access mode of operation, whereby said system is thereby adapted to execute a subset of a subset of the subroutine instructions stored in said main memory unit.

References Cited

UNITED STATES PATENTS

| | | | |
|---|---|---|---|
| 3,036,773 | 5/1962 | Brown | 235—157 |
| 3,202,971 | 8/1965 | Blaauw | 340—172.5 |
| 3,297,997 | 1/1967 | Grady et al. | 340—172.5 |
| 3,297,998 | 1/1967 | Klein | 340—172.5 |

PAUL J. HENON, *Primary Examiner.*

R. B. ZACHE, *Assistant Examiner.*